(No Model.)
F. ROEDIGER.
CAR BRAKE.
No. 500,952. Patented July 4, 1893.
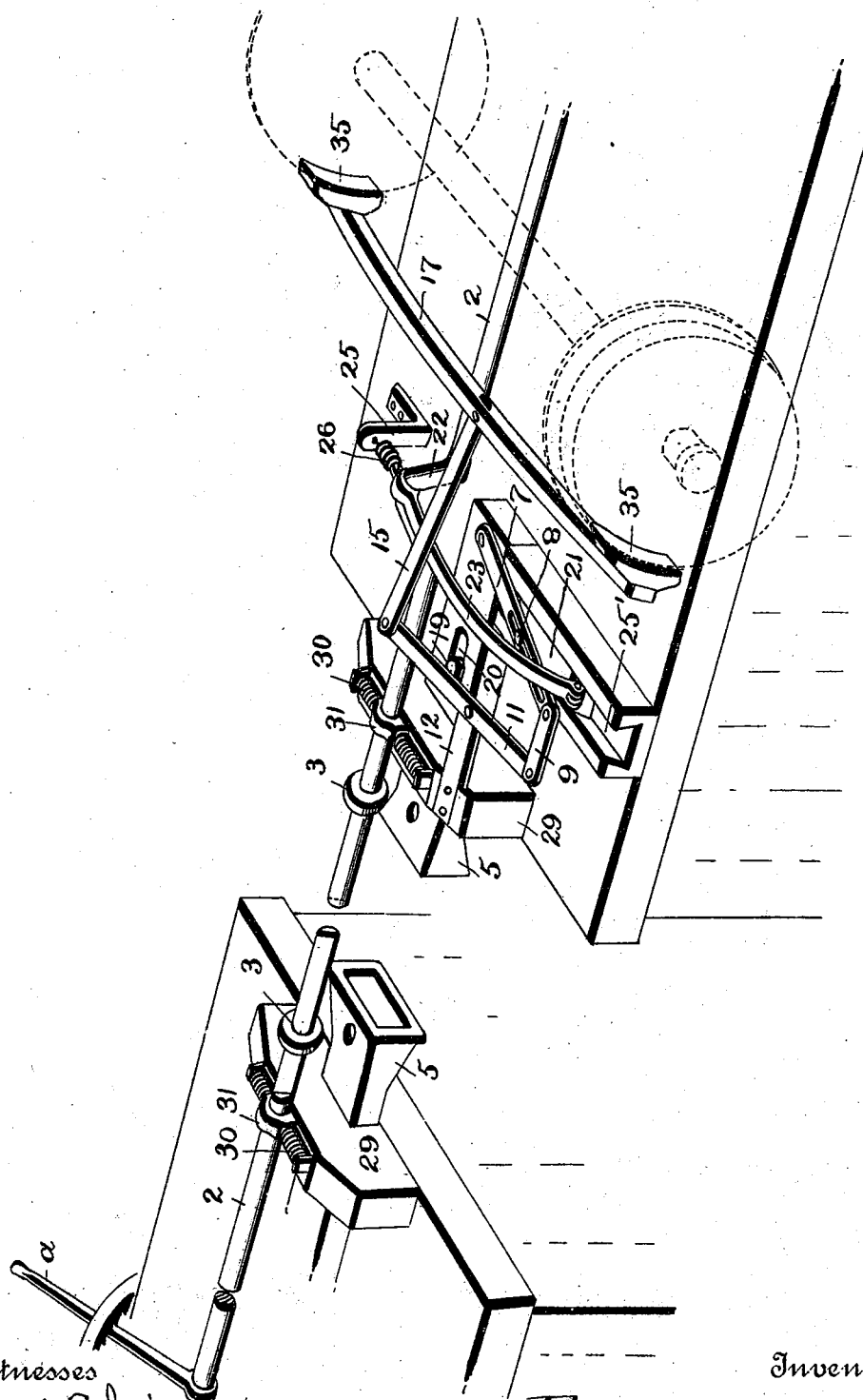
Witnesses
Albert Speiden
Van Buren Hillyard
Inventor
Fredrick Roediger
By Attorneys
R.S. & A.P. Lacey

UNITED STATES PATENT OFFICE.

FREDRICK ROEDIGER, OF NASHVILLE, TENNESSEE, ASSIGNOR TO SUSAN V. McCORMICK, OF SAME PLACE.

CAR-BRAKE.

SPECIFICATION forming part of Letters Patent No. 500,952, dated July 4, 1893.

Application filed January 31, 1893. Serial No. 460,378. (No model.)

*To all whom it may concern:*

Be it known that I, FREDRICK ROEDIGER, a subject of the Emperor of Germany, residing at Nashville, in the county of Davidson and State of Tennessee, have invented certain new and useful Improvements in Automatic Self-Coupling Car-Brakes; and I do hereby declare the following to be a full, clear, and exact description of the invention, such as will enable others skilled in the art to which it appertains to make and use the same.

This invention relates to a system of car brakes which are automatic in their action and which are under the control of the engineer, whereby the brakes can be applied or thrown off at a moment's notice.

The improvement consists of the novel features and the peculiar construction and combination of the parts which will be hereinafter more fully described and claimed and which are shown in the annexed drawing, which is a bottom perspective view of the contiguous ends of two cars, showing the application of the invention, and showing the lever which is under the control of the engineer to set or release the brakes. Each car will be similarly equipped and in addition to the draw heads 5 will be provided with head blocks 29 to which are attached the bearings 31 in which are journaled the rods 2 which extend beneath the cars. These bearings 31 are constructed to have a lateral movement to permit the rods 2 to adapt themselves to the line of strain when the cars are passing around curves and are held in a normal position by the lateral springs 30, one on each side of the bearing 31, which springs have their outer ends secured to the head block 29. The ends of the rods 2 are matched, being preferably halved, so that when the two ends come together in close relation they will have the same uniform appearance as that portion of the rod between its ends. The rings 3 on the projecting ends of the rods 2, serve to confine and hold the said rods from lateral displacement but admit of the longitudinal movement of the one on the other. The ends of the rods and the outer faces of the rings are mutually constructed to guide the said rods in their passage through the said rings. The rod 2 is provided with crank portion 22 for the purpose hereinbefore specified and is held in and returned to a normal position by spring 26 which is attached to bracket 25 depending from the car and to the said crank portion 22. The sliding block 21 held and adapted to move in ways 25, is provided with pin 8 and is connected with the crank portion 22 by the rod 23. The lever 7 pivotally connected at its inner end with the draw head 5, is slotted to receive the pin 8 which works in the said slot, and is connected at its outer end with the near end of lever 11 which is pivotally supported on the arm 12 that is extended from the head block 25 by the link 9. The lever 11 is approximately parallel with the rod 23 and the lever 7 and is connected at the end opposite link 9 with the brake beam 17 by the link 15. The brake shoes 35 are secured to the ends of the brake beam 17. The pin 19 on the car enters slot 20 in the draw bar 5 and limits the movement of the latter.

The operation of the invention is as follows: When the cars are run together the matching ends of the rods 2 will slide past each other and through the rings 3 thereby automatically coupling, the cars being coupled in the usual manner. In the event of the cars running together as when the train is slowed up or going down grade, the draw bars will be pushed in and carry the inner end of lever 7 causing the said lever to turn on the pin 8 and through link 9 turn lever 11 on its fulcrum and apply the brakes. Obviously, when the engine starts up or draft is caused to come upon the draw bars, the latter will be drawn out and the reverse of the movement of the parts 7 and 11 will take place and release the brakes. On rotating the bar 2 which is effected through means of the lever *a* which is under the control of the engineer, the block 21 is moved in the ways 25', through the crank 22 and arm 23, and actuates the lever 7 by means of the pin 8 working in the slot of the said lever and applies or releases the brakes as required, the direction of rotation of the said rod governing the movement of the brakes. It will be understood that the block 21 has a movement across the plane of the lever 7 and by reason of the positive engagement, the slot and pin, between the said lever and block the lever is moved independently of the motion of the cars to apply or release the brakes. Hence the brakes are at all times under the control of the engineer.

Having thus described my invention, what I claim, and desire to secure by Letters Patent, is—

1. The combination with a brake beam, and a sliding draw bar, of the lever 11 pivoted between its ends and having one end connected with the said brake beam, and the lever 7 having its outer end connected with the other end of the said lever 11, and having its inner end connected to the said draw bar, and having the fulcrum between the said ends, substantially as and for the purpose described.

2. The combination with a brake beam, and a sliding draw bar, of the sliding block 21, lever 7 fulcrumed between its ends on the said block and having one end connected with the draw bar, and the lever 11 arranged approximately parallel with the lever 7 and having one end connected therewith, and having its other end connected with the said brake beam, substantially as described.

3. The combination with a brake beam, and a sliding draw bar, of the sliding block 21, lever 7 fulcrumed between its ends on the said block and having one end connected with the draw bar, the lever 11 arranged approximately parallel with the lever 7 and having one end connected therewith, and having its other end connected with the said brake beam, the bar 2 having crank portion 22 and the rod 23 connecting the said crank with the said sliding block, substantially as described.

4. The combination with a system of brake levers attached to each car of a train, of a rod journaled lengthwise of the car and having a crank portion in connection with and adapted to actuate the said brake levers on being rotated, and having its ends extended and constructed to match with like ends of corresponding rods on the adjacent cars, to cause the said rods of the several cars to turn together, and rings 3 on the extended ends of the said rods substantially as set forth.

5. The combination with a system of brake levers attached to each car of a train, of bearings at the ends of the cars adapted to move laterally, springs on each side of the said bearings to normally hold them in a yielding position, and a rod journaled lengthwise of the car and having connection with and adapted to actuate the said brake levers on being rotated, and having its ends extended and constructed to match with the corresponding ends of the rods on the adjacent cars, to cause the said rods of the several cars to turn together, substantially as set forth.

6. The combination with a system of brake levers, attached to each car of a train, of a rod journaled lengthwise of the car and having connection with and adapted to actuate the said brake levers on being rotated, and having its ends extended and constructed to match with the corresponding ends of the rods on the adjacent cars, to cause the said rods of the several cars to turn together, and rings on the ends of the said rods to embrace the free ends of the adjacent rods, substantially as and for the purpose described.

In testimony whereof I affix my signature in presence of two witnesses.

FREDRICK ROEDIGER.

Witnesses:
J. B. McCormick,
C. F. X. Robinson.